(12) United States Patent
Yuan

(10) Patent No.: US 10,608,728 B2
(45) Date of Patent: Mar. 31, 2020

(54) COMMUNICATION DEVICE AND METHOD FOR REDUCING INTERFERENCE

(71) Applicant: Intel Corporation, Santa Clara, CA (US)

(72) Inventor: Fang Yuan, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/080,025

(22) PCT Filed: Apr. 1, 2016

(86) PCT No.: PCT/CN2016/078286
§ 371 (c)(1),
(2) Date: Aug. 27, 2018

(87) PCT Pub. No.: WO2017/166274
PCT Pub. Date: Oct. 5, 2017

(65) Prior Publication Data
US 2019/0052340 A1 Feb. 14, 2019

(51) Int. Cl.
H04B 7/08 (2006.01)
H04B 7/06 (2006.01)
H04B 17/336 (2015.01)
H04B 17/364 (2015.01)
H04L 5/00 (2006.01)
H04L 25/02 (2006.01)

(52) U.S. Cl.
CPC .......... *H04B 7/086* (2013.01); *H04B 7/0617* (2013.01); *H04B 17/336* (2015.01); *H04B 17/364* (2015.01); *H04L 5/0007* (2013.01); *H04L 25/0202* (2013.01)

(58) Field of Classification Search
CPC .... H04B 7/086; H04B 17/336; H04B 17/364; H04B 7/0617; H04L 5/0007; H04L 25/0202
USPC ........................................................ 375/262
See application file for complete search history.

(56) References Cited

U.S. PATENT DOCUMENTS

2008/0247364 A1* 10/2008 Kim ..................... H04B 7/0671
370/336
2013/0039401 A1* 2/2013 Han ..................... H04B 7/0617
375/222

(Continued)

FOREIGN PATENT DOCUMENTS

WO 2008157167 A2 12/2008

OTHER PUBLICATIONS

International Search Report based on application No. PCT/CN2016/078286 (11 pages) dated Jan. 6, 2017 (Reference Purpose Only).

(Continued)

*Primary Examiner* — Michael R Neff

(57) ABSTRACT

A communication device and a method for Orthogonal Frequency Division Multiplexing (OFDM) configured to receive a signal from a second device; perform a channel estimation on the signal, wherein the channel estimation comprises determining a channel path gain, a channel path delay, and at least one of a channel path angle of arrival (AoA) or a channel path angle of departure (AoD); determine an optimal analog beamforming direction based on the channel estimation; and communicating the data using the analog beamforming.

20 Claims, 9 Drawing Sheets

(56) References Cited

U.S. PATENT DOCUMENTS

| | | | |
|---|---|---|---|
| 2014/0185434 A1* | 7/2014 | Kim | H04L 41/0668 |
| | | | 370/228 |
| 2014/0314006 A1 | 10/2014 | Suh et al. | |
| 2016/0013850 A1 | 1/2016 | Zhou et al. | |
| 2016/0191176 A1* | 6/2016 | O'Keeffe | H01Q 3/267 |
| | | | 455/63.4 |
| 2018/0183509 A1* | 6/2018 | Luo | H04B 7/002 |

OTHER PUBLICATIONS

Fang, Yuan et al., "Channel Direction Information Probing for Multi-antenna Cognitive Radio System", EURASIP Journal on Advances in Signal Processing, 2015.

3GPP TR 36.873, 3rd Generation Partnership Project, Technical Specification Group Radio Access Network; Study on 3D channel model for LTE (Release 12), 2015.

* cited by examiner

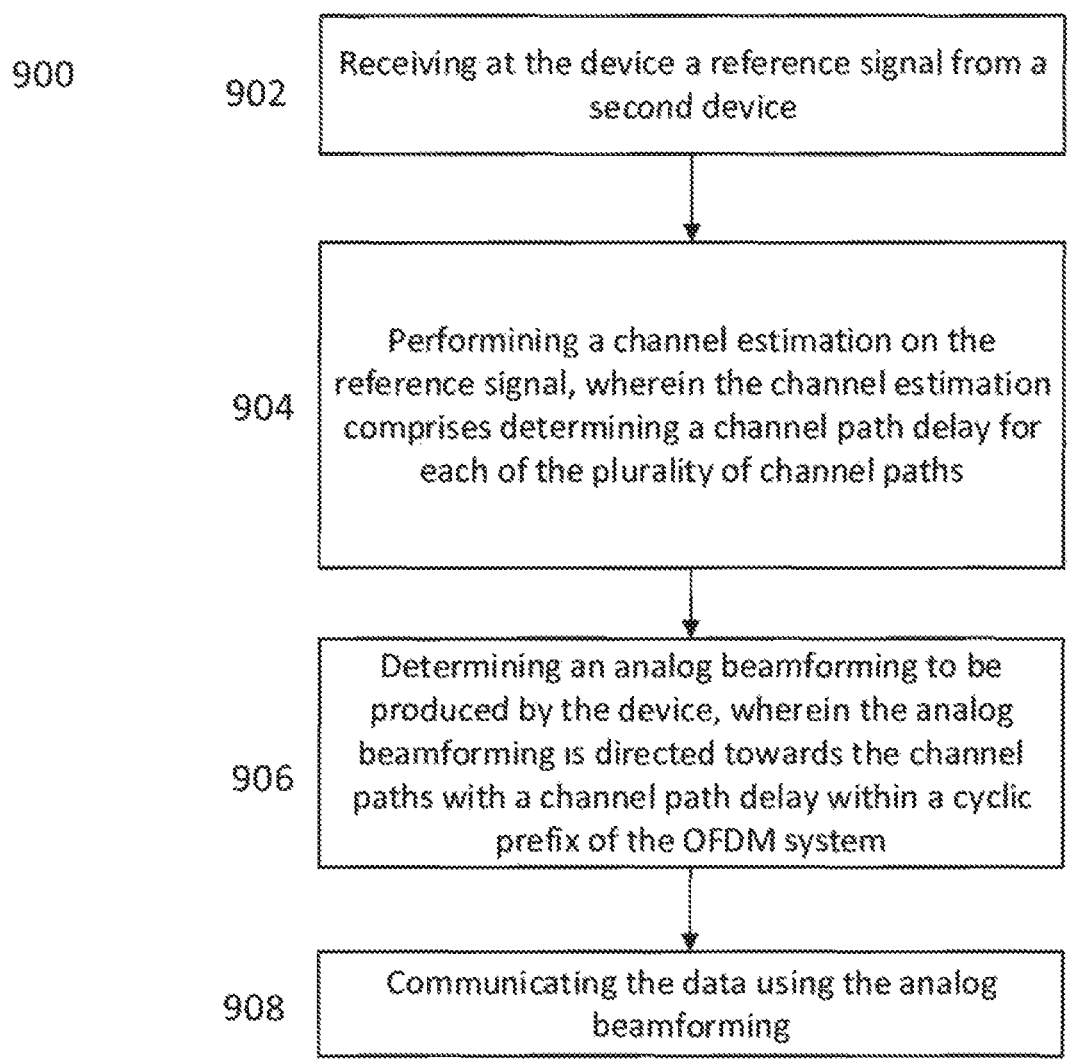

COMMUNICATION DEVICE AND METHOD FOR REDUCING INTERFERENCE

CROSS-REFERENCE TO RELATED APPLICATIONS

This application is a national stage entry according to 35 U.S.C. § 371 of PCT Application No. PCT/CN2016/078286 filed on Apr. 1, 2016, which is incorporated herein by reference in its entirety.

TECHNICAL FIELD

Various aspects of this disclosure relate generally to a method and a device for wireless communications.

BACKGROUND

Orthogonal Frequency Division Multiplexing (OFDM) is the core physical layer technology in 4G Long Term Evolution (LTE) systems where a cyclic prefix (CP) is used to combat the inter-symbol interference (ISI) caused by the channel delays.

OFDM systems divide the available frequency spectrum into several sub-carriers. In order to obtain high spectrum efficiency, the frequency responses of the subcarriers in OFDM overlap and are orthogonal, which can be maintained with only a small loss in the signal to noise ratio (i.e. small gain in ISI) by using the CP.

In order to reduce the ISI completely, the length of the CP has to be longer than the maximum channel delay. This, of course, increases the system's overhead and decreases the OFDM system's spectrum efficiency (SE). Furthermore, it is expected that in the 5G system, the bandwidth of PFDM will be expanded to 100 or possibly even 200 megahertz (Mhz) and the corresponding OFDM symbol duration will be reduced to one-fifth or one-tenth of that employed in the 4G LTE system. As a result, the overheard that the CP occupies will be a higher ratio in one OFDM symbol, and the system's SE will significantly degrade as the ratio increases.

In practice, a moderate CP is adopted in the OFDM system in order to avoid too large an overhead of the CP. In this case, there may be excessive channel delays which are larger than the CP. Since these excessive channel delays have a delay spread longer than the CP, the CP cannot combat them, resulting in ISI which degrades the system performance.

Therefore, it is desirable to find a method and a communication device which is configured to allow the OFDM system to employ a moderate CP while reducing the impact of ISI due to excessive channel delays.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 9 shows a flowchart in an aspect of this disclosure.

DESCRIPTION

Figure 1:
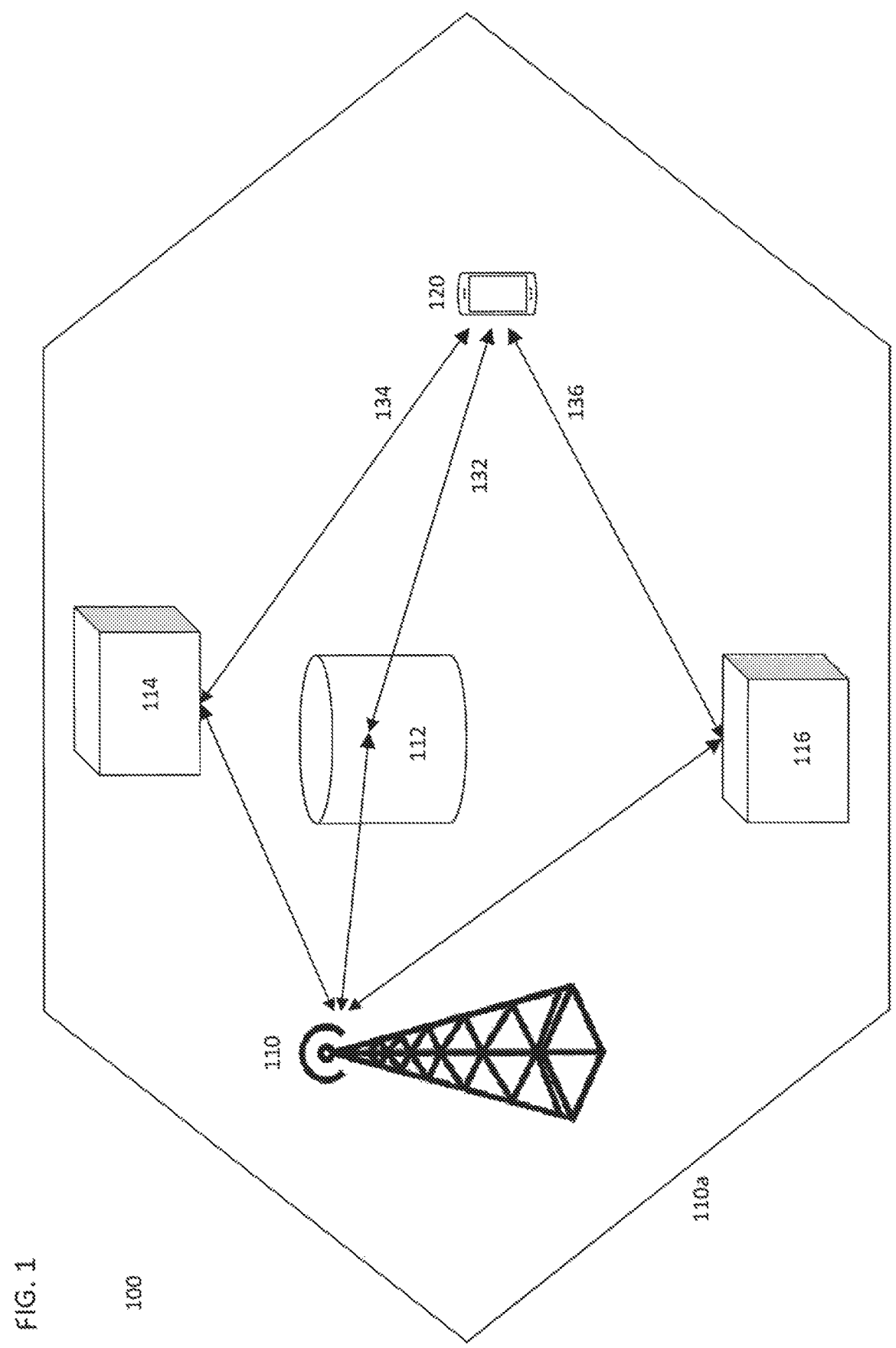
FIG. 1 shows a communication network in an aspect of this disclosure.

The following details description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The words "plural" and "multiple" in the description and the claims, if any, are used to expressly refer to a quantity greater than one. Accordingly, any phrases explicitly invoking the aforementioned words (e.g. "a plurality of [objects]", "multiple [objects]") referring to a quantity of objects is intended to expressly refer more than one of the said objects. The terms "group", "set", "collection", "series", "sequence", "grouping", "selection", etc., and the like in the description and in the claims, if any, are used to refer to a quantity equal to or greater than one, i.e. one or more. Accordingly, the phrases "a group of [objects]", "a set of [objects]", "a collection of [objects]", "a series of [objects]", "a sequence of [objects]", "a grouping of [objects]", "a selection of [objects]", "[object] group", "[object] set", "[object] collection", "[object] series", "[object] sequence", "[object] grouping", "[object] selection", etc., used herein in relation to a quantity of objects is intended to refer to a quantity of one or more of said objects. It is appreciated that unless directly referred to with an explicitly stated plural quantity (e.g. "two [objects]" "three of the [objects]", "ten or more [objects]", "at least four [objects]", etc.) or express use of the words "plural", "multiple", or similar phrases, references to quantities of objects are intended to refer to one or more of said objects.

As used herein, a "circuit" may be understood as any kind of a logic implementing entity, which may be special purpose circuitry or a processor executing software stored in a memory, firmware, and any combination thereof. Furthermore, a "circuit" may be a hard-wired logic circuit or a programmable logic circuit such as a programmable processor, for example a microprocessor (for example a Complex Instruction Set Computer (CISC) processor or a Reduced Instruction Set Computer (RISC) processor). A "circuit" may also be a processor executing software, e.g., any kind of computer program, for example a computer program using a virtual machine code, e.g., Java. Any other kind of implementation of the respective functions which will be described in more detail below may also be understood as a "circuit". It may also be understood that any two (or more) of the described circuits may be combined into one circuit.

A "processing circuit" (or equivalently "processing circuitry") as used herein is understood as referring to any circuit that performs an operation(s) on signal(s), such as e.g. any circuit that performs processing on an electrical signal or an optical signal. A processing circuit may thus refer to any analog or digital circuitry that alters a characteristic or property of an electrical or optical signal, which may include analog and/or digital data. A processing circuit may thus refer to an analog circuit (explicitly referred to as "analog processing circuit(ry)"), digital circuit (explicitly referred to as "digital processing circuit(ry)"), logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Accordingly, a processing circuit may refer to a circuit that performs processing on an electrical or optical signal as hardware or as software, such as software executed on hardware (e.g. a processor or microprocessor). As utilized herein, "digital processing circuit(ry)" may refer to a circuit implemented using digital logic that performs processing on a signal, e.g. an electrical or optical signal, which may include logic circuit(s), processor(s), scalar processor(s), vector processor(s), microprocessor(s), controller(s), microcontroller(s), Central Processing Unit(s) (CPU), Graphics Processing Unit(s) (GPU), Digital Signal Processor(s) (DSP), Field Programmable Gate Array(s) (FPGA), integrated circuit(s), Application Specific Integrated Circuit(s) (ASIC), or any combination thereof. Furthermore, it is understood that a single a processing circuit may be equivalently split into two separate processing circuits, and conversely that two separate processing circuits may be combined into a single equivalent processing circuit.

As used herein, "memory" may be understood as an electrical component in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, it is appreciated that registers, shift registers, processor registers, data buffers, etc., are also embraced herein by the "term" memory. It is appreciated that a single component referred to as "memory" or "a memory" may be composed of more than one different type of memory, and thus may refer to a collective component comprising one or more types of memory. It is readily understood that any single memory "component" may be distributed or/separated multiple substantially equivalent memory components, and vice versa. Furthermore, it is appreciated that while "memory" may be depicted, such as in the drawings, as separate from one or more other components, it is understood that memory may be integrated within another component, such as on a common integrated chip.

As used herein, a "cell", in the context of telecommunications, may be understood as a sector served by a base station. Accordingly, a cell may be a set of geographically co-located antennas that correspond to a particular sector of a base station. A base station may thus serve one or more "cells" (or "sectors"), where each cell is characterized by a distinct communication channel. An "inter-cell handover" may be understood as a handover from a first "cell" to a second "cell", where the first "cell" is different from the second "cell". "Inter-cell handovers" may be characterized as either "inter-base station handovers" or "intra-base station handovers". "Inter-base station handovers" may be understood as a handover from a first "cell" to a second "cell", where the first "cell" is provided at a first base station and the second "cell" is provided at a second, different, base station. "Intra-base station handovers" may be understood as a handover from a first "cell" to a second "cell", where the first "cell" is provided at the same base station as the second "cell". A "serving cell" may be understood as a "cell" that a mobile terminal is currently connected to according to the mobile communications protocols of the associated mobile communications network standard. Furthermore, the term "cell" may be utilized to refer to any of a macrocell, microcell, picocell, or femtocell, etc.

The term "base station", used in reference to an access point of a mobile communications network, may be understood as a macro-base station, micro-base station, Node B, evolved Node B (eNodeB, eNB), Home eNodeB, Remote Radio Head (RRH), or relay point, etc.

It is to be noted the ensuing description discusses utilization of the mobile communications device under 3GPP (Third Generation Partnership Project) specifications, notably Long Term Evolution (LTE), Long Term Evolution-Advanced (LTE-A), and/or 5G. It is understood that such exemplary scenarios are demonstrative in nature, and accordingly may be similarly applied to other mobile communication technologies and standards, such as WLAN (wireless local area network), WiFi, UMTS (Universal Mobile Telecommunications System), GSM (Global System for Mobile Communications), Bluetooth, CDMA (Code Division Multiple Access), Wideband CDMA (W-CDMA), etc. The examples provided herein are thus understood as being applicable to various other mobile communication technologies, both existing and not yet formulated, particularly in cases where such mobile communication technologies share similar features as disclosed regarding the following examples.

The term "network" as utilized herein, e.g. in reference to a communication network such as a mobile communication network, is intended to encompass both an access component of a network (e.g. a radio access network (RAN) component) and a core component of a network (e.g. a core network component).

In an aspect of this disclosure, an OFDM system with analog beamforming is designed in order to resolve the channel paths from different channel directions. The analog beamforming is designed in a way to gather the channel gains (i.e. channel powers) from the preferred channel direction(s) while weakening the channel power from other channel directions. Therefore, by designing the analog beamforming directions towards the dominant channel paths whose delays fall within the length of the CP, the channel gains from these paths is gathered in the OFDM signal, while the channel gains from other paths whose delay exceeds the CP are weakened. By weakening the channel gains with excessive channel delays, the inter-symbol interference ISI is reduced. This results in an improvement in the signal-to-interference ratio and the spectrum efficiency SE of the ODFM system.

FIG. 1 shows a communication network 100 in an aspect of this disclosure. It is appreciated that communication network 100 is exemplary in nature and thus may be simplified for purposes of this explanation.

Communications Network 100 may be configured in accordance with the network architecture of any one of, or any combination of, 5G, LTE (Long Term Evolution), WLAN (wireless local area network), WiFi, UMTS (Universal Mobile Telecommunications System), GSM (Global System for Mobile Communications), Bluetooth. CDMA (Code Division Multiple Access), Wideband CDMA (W-CDMA), etc.

Base station 110 may be associated with a radio access section of communication network 100. i.e. the Radio Access Network (RAN) of communication network 100.

Base station 110 may thus act as an interface between the RAN of communication network 100 and an underlying core network of communication network 100 and may allow any proximate UEs, such as, for example, UEs 120 to exchange data with the core network of communication network 100.

Communication network 100 may include at least a base station 110 with a corresponding cover region, or cell, 110a. Base station 110 may be configured as an eNB with beamforming capabilities. Communication network 100 may also contain UE 120. Base station 110 may send communications to UE 120 (and vice versa) using OFDM, i.e. using multipath. For example, base station may send a send an OFDM symbol to UE 120 via three paths, 132, 134, and 136. These paths may arrive at the UE 120 at different times after reflecting off of structures 112, 114, and 116, respectively. Due to multipath, each symbol transmitted by the base station 110 is received multiple times at the receiver end, i.e. the UE 120. Because the UE 120 receives the signal multiple times in multiple duplications, a channel delay, i.e. a delay spread may cause inter-symbol interference ISI. To reduce the ISI or eliminate it completely, the base station inserts a cyclic prefix CP in a guard period before each symbol.

However, in order to eliminate the ISI entirely to maximize the efficiency of the system, in theory, the length of the CP must be longer than the maximum channel delay. This decreases the system's efficiency as the CP may take up a higher ratio of the corresponding symbol duration. In practice, the base station inserts a moderate CP in order to avoid too large an overhead of the CP. For example, in LTE systems, in which an LTE symbol is 71.4 µs, eNBs typically use a CP length of 4.7 µs (normal CP). However, using a moderate CP results in channel delays which are longer than the CP. In an aspect of this disclosure, the base station is configured to reduce the inter-symbol interference ISI while employing a moderate CP by determining optimal analog beamforming patterns.

Figure 2:
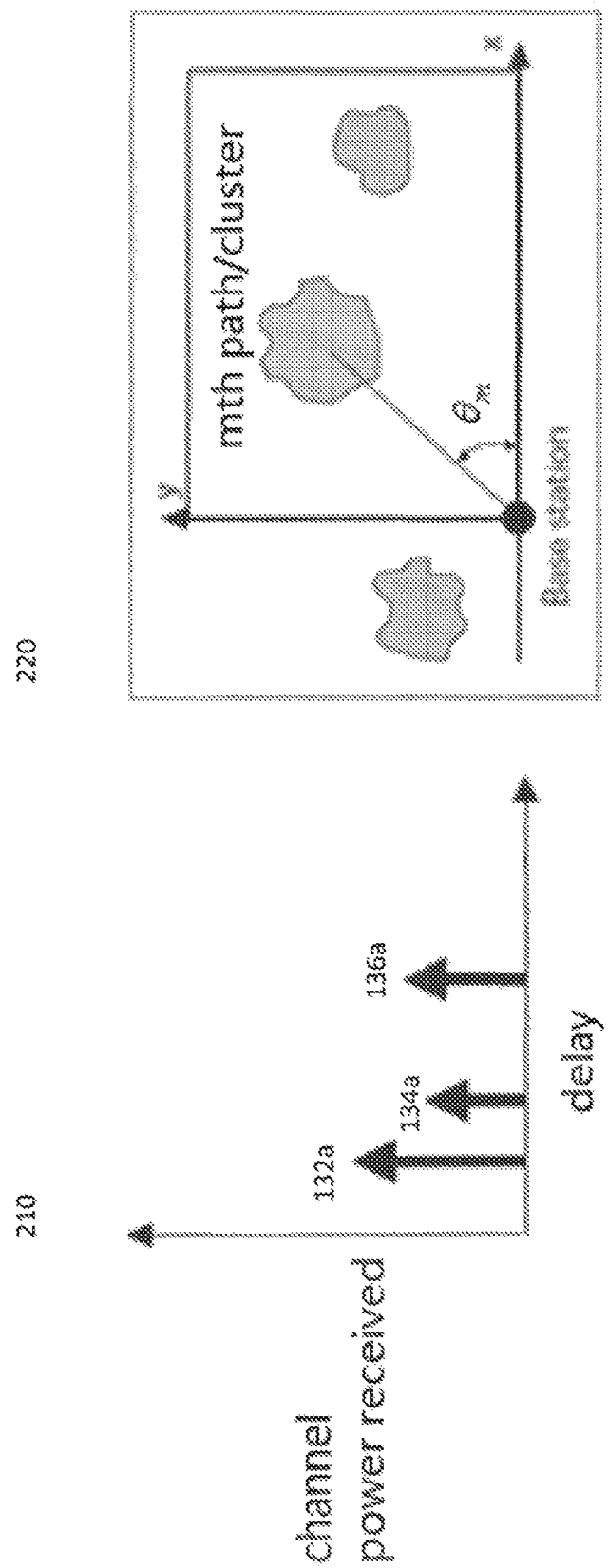
FIG. 2 shows OFDM channels in a communication network in an aspect of this disclosure.

FIG. 2 shows exemplary OFDM channels which may correspond to the communication network 100 in FIG. 1 in an aspect of this disclosure. An OFDM channel in the time domain 210 and an OFDM channel in the spatial domain 220 are shown. It is appreciated that 210 and 220 are exemplary in nature and may thus be simplified for purposes of this explanation.

Each channel in the OFDM system has a number of paths (i.e. M paths). Each path has a channel delay in the time domain. For example, the time domain representation of channel delays shown in 210 may represent paths 132-136 of FIG. 1, e.g. channel delay 132a may correspond to path 132 in FIG. 1, etc.

The channel power, i.e. the channel gain, for the mth path is denoted as $G_m$ and $\tau_m$ is the corresponding channel delay (m=1, 2, ..., M). For simplicity, assume $\tau_m < \tau_n$ if m<n. To avoid ISI in OFDM systems, the length of the CP, t, needs to be larger than $\tau_M$, which may cause a large overhead if the maximum channel delay $\tau_M$ is large. In order to reduce the overhead, a moderate CP, e.g. $\tau_l < t < \tau_{l+1}$, is applied in practice, where $\tau_{l+1} < \tau_M$. In this case, the resulting signal to noise ratio (SINR) on each sub-carrier of the OFDM system is expressed by:

$$SINR_{before} = \frac{P \sum_{m=1}^{l} G_m}{1 + P \sum_{j=l+1}^{M} G_j} \quad (1)$$

where additive receiver noise is assumed to be one, and P is the transmit power per each sub-carrier.

For a fixed $G_m$, the above SINR means that the shorter the length the CP is, the smaller the SINR on each sub-carrier of the OFDM system. Although the overhead of CP is reduced by taking a smaller CP, the spectrum efficiency will decrease because of the smaller SIMR.

In an aspect of this disclosure, the OFDM system can set a smaller CP while the SINR will not be degraded too much by excessive channel delays.

If the OFDM receiver at the base station, e.g. eNB, is equipped with an array of antenna elements for analog beamforming, each path has an angle of arrival (AoA) which is associated with the location of the reflecting cluster in the propagation channel. In 210, for example, $\theta_m$ may be the AOA for the mth cluster. This cluster (m) has a channel gain of $G_m$ and a delay of $\tau_m$.

The received OFDM signals are filtered by analog beamforming at the receiver. If analog beamforming is implemented by a linear antenna array, the analog beamforming associated with the antenna array may be given by $$f(u) = [1, e^{-ju}, \ldots, e^{-j(N-1)u}], \quad (2)$$

where N is the number of antenna elements from the beamformer, such as a discrete Fourier transform (DFT) beamformer.

The expression of the mth channel path of the OFDM transmitter to the receiver is expressed as $$h_m(\tau_m, \theta_m) = \sqrt{G_m}[1, e^{-j\theta_m}, \ldots, e^{-j(N-1)\theta_m}]. \quad (3)$$

As a result, the received signal gain on this path becomes:

$$Q_m = |h_m(\tau_m, \theta_m) f(u)^H|^2 = \quad (4)$$

$$G_m |[1, \ldots, e^{-j(N-1)\theta_m}][1, \ldots, e^{-j(N-1)u}]^H|^2 = G_m \frac{\sin^2\left(\frac{N(\theta_m - u)}{2}\right)}{\sin^2\left(\frac{\theta_m - u}{2}\right)}$$

Consequently, the new SINR after analog beamforming on each sub-carrier of the OFDM system becomes:

$$SINR_{after} = \frac{P \sum_{m=1}^{l} Q_m}{1 + P \sum_{j=l+1}^{M} Q_j} = \frac{P \sum_{m=1}^{l} G_m \frac{\sin^2\left(\frac{N(\theta_m - u)}{2}\right)}{\sin^2\left(\frac{\theta_m - u}{2}\right)}}{1 + P \sum_{j=l+1}^{M} G_j \frac{\sin^2\left(\frac{N(\theta_j - u)}{2}\right)}{\sin^2\left(\frac{\theta_j - u}{2}\right)}} \quad (5)$$

Since the value of $$\frac{\sin^2\left(\frac{N(x - y)}{2}\right)}{\sin^2\left(\frac{x - y}{2}\right)}$$

decreases with the value of |x−y|, the base stations (i.e. eNB, or other communication device) in an aspect of this disclosure, is configured to choose an analog beamforming direction, u, separate from the AoAs ($\theta_j$) with excessive channel delays, thereby reducing the interference in the signal to noise ratio (as shown in $SINR_{after}$). As a result, the spectrum efficiency of the OFDM system is increased.

Figure 3:
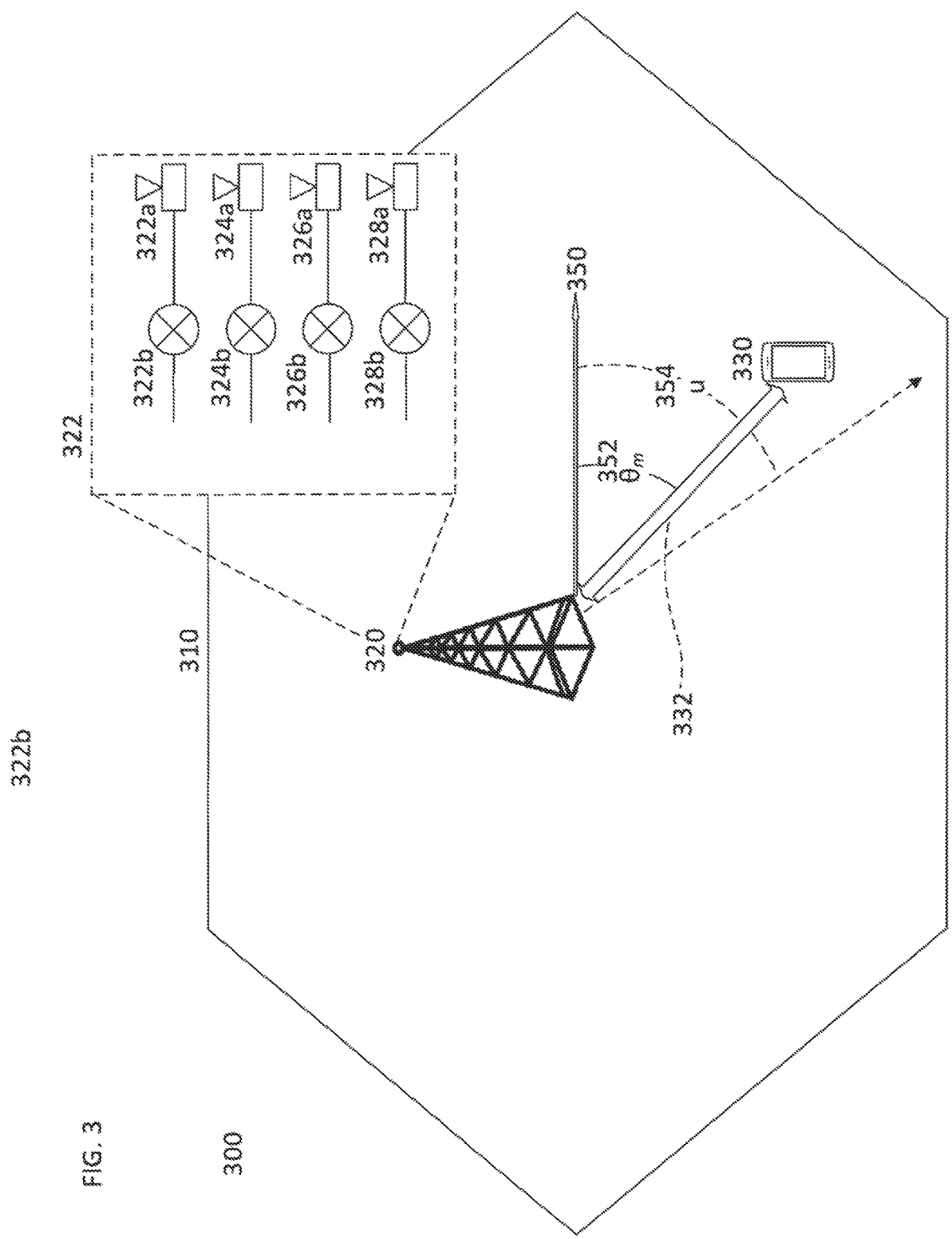
FIG. 3 shows a communication network using analog beamforming in an aspect of this disclosure.

FIG. 3 shows a communication network 300 in an aspect of this disclosure. Communication network 300 shows a single analog beamforming direction, u 354, from a base station (e.g. eNB) 320. It is appreciated that communication network 300 is exemplary in nature and may thus be simplified for purposes of this explanation.

Base station (e.g. eNB) 320 provides coverage to cell 310 and may have a subarray of N antenna elements 322a-328a (in this example, N=4). Each antenna element has a phase shifter 322b-328b controlled by the analog beamforming weight. This weights of the phase shifters may be implemented according to equation (2). The eNB is configured to control the phase shifters 322b-328b in order to increase the gains in a desired direction and suppress the gains in undesired directions, thereby, increasing the SINR as detailed above.

The line from which locations (i.e. angles) are measured in relation to the base station is known as the broadside 350. The arrow 332 from the UE 330 and the corresponding angle $\theta_m$ 352 represent the channel path and the angle of arrival (AoA) or the angle of departure (AoD), depending on which direction the data communication is occurring in, i.e. the downlink or the uplink. Only a single path 332 is shown in communication network 300, but it is appreciated that the OFDM system employs a multipath approach which may reflect off of other structures within coverage region 310 (as shown in FIG. 1). By applying a phase shift to the signals transmitted by the antenna elements, the direction at which constructive interference occurs may be altered so as to direct a beamform towards a specific direction. The amplitudes and phases of the signals may be adjusted by applying suitable antenna weights.

Figure 4:
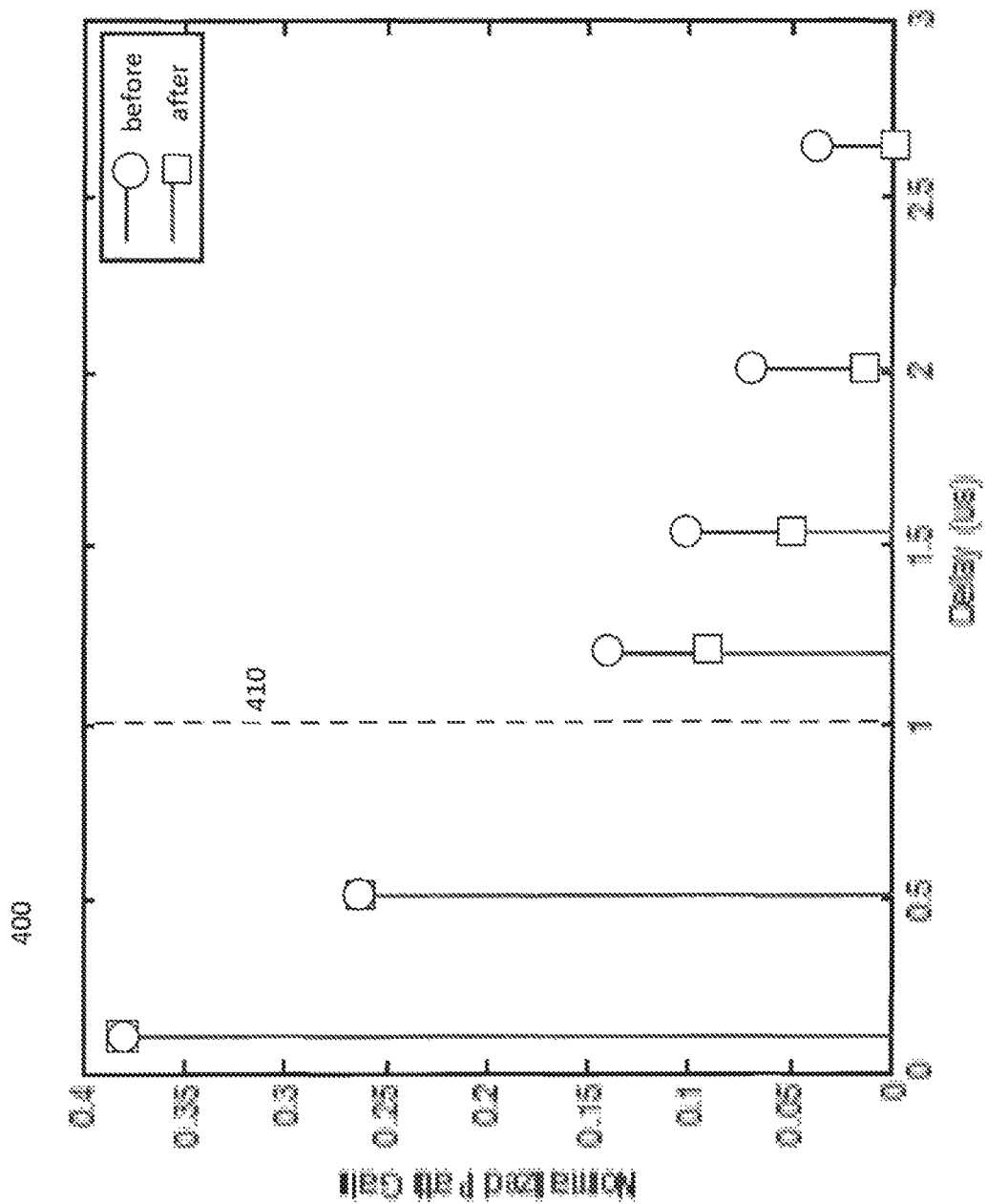
FIG. 4 shows a graph of channel gains using analog beamforming in an aspect of this disclosure.

FIG. 4 shows an example graph 400 of channel gains impacted by analog beamforming in an OFDM system. It is appreciated that graph 400 is exemplary in nature and may thus be simplified for purposes of this explanation.

Graph 400 shows a comparison of channel powers before and after analog beamforming. The normalized channel gains before analog beamforming (i.e. without analog beamforming) are denoted with a circle and the normalized channel gains after analog beamforming is implemented are denoted with a square. In this example, the root mean square (RMS) of the channel delays, i.e. the delay spread (DS) is 1 μs; the RMS of the AoAs, i.e. the angle spread, is 8 degrees, the length of the CP is 1 μs: the number of antennas, i.e. N, is 64; and the ratio of antenna distance to wavelength is 0.5.

The length of the CP is marked by 410. By implementing analog beamforming, the gains which are longer in duration than the CP are reduced, thereby reducing the ISI and increasing the SINR.

According to the 3GPP channel modeling technology, a channel path with a larger delay most likely has a smaller channel gain and a larger AoA deviation. Therefore, one naïve way to set the analog beamforming direction is to align it with the AoA of the first channel path, i.e. u=$\theta_1$, to minimize the received gains which occur after the CP.

However, there are more efficient ways to optimize the beamforming direction in order to maximize the SINR (or reduce the ISI).

In an aspect of this disclosure, the beamforming direction u is determined by employing a maximum SINR method as given by the equation:

$$u = \mathrm{argmax}_u SINR_{after} = \mathrm{argmax}_u \frac{P \sum_{m=1}^{l} G_m \frac{\sin^2\left(\frac{N(\theta_m - u)}{2}\right)}{\sin^2\left(\frac{\theta_m - u}{2}\right)}}{1 + P \sum_{j=l+1}^{M} G_j \frac{\sin^2\left(\frac{N(\theta_j - u)}{2}\right)}{\sin^2\left(\frac{\theta_j - u}{2}\right)}} \quad (6)$$

By employing equation (6) in order to determine the beamforming direction, the eNB ensures selecting a beamforming direction, u, which maximizes the spectrum efficiency of the OFDM system.

In another aspect of this disclosure, the eNB may set the beamforming direction by employing a minimum ISI method, thereby reducing the noise in the SINR in order to increase the spectrum efficiency of the OFDM system. This method is given by the equation:

$$u = \mathrm{argmin}_u ISI = \mathrm{argmin}_u P \sum_{j=l+1}^{M} G_j \frac{\sin^2\left(\frac{N(\theta_j - u)}{2}\right)}{\sin^2\left(\frac{\theta_j - u}{2}\right)} \quad (7)$$

Figure 5:
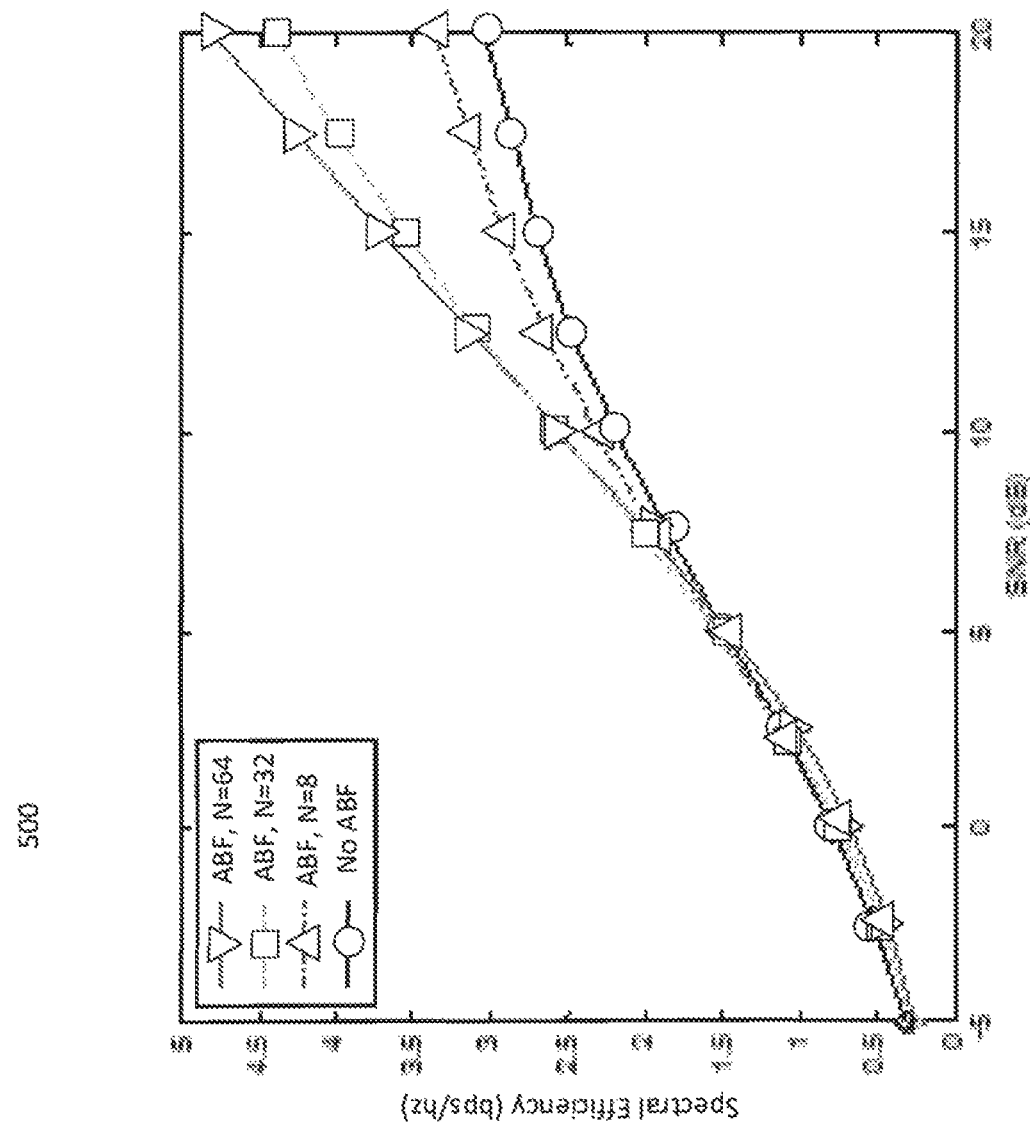
FIG. 5 shows an example of spectrum efficiency changed by analog beamforming in an aspect of this disclosure.

FIG. 5 shows a graph 500 which shows the change in spectrum efficiency caused by analog beamforming in an aspect of this disclosure.

Graph 500 shows how analog beamforming (ABF) changes subcarrier spectral efficiency under increasing signal to noise ratios (SNRs). Additionally, as the number of antenna elements (N) increases, the spectral efficiency of the system also increases. The results reveal that, by using the analog beamforming as described in this disclosure, excessive channel delays are mitigated, resulting in a subcarrier spectrum efficiency that increases significantly under higher SNRs (>10 dBs).

Figure 6:
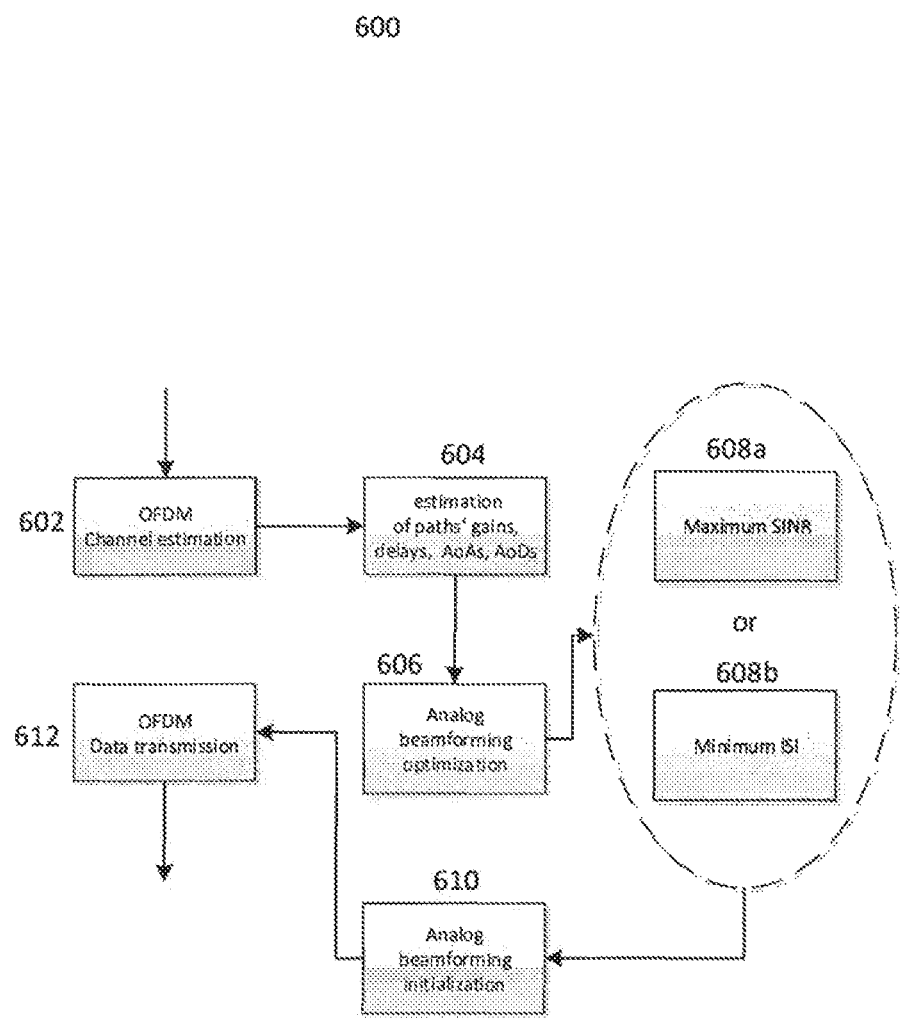
FIG. 6 shows a flowchart in an aspect of this disclosure.

FIG. 6 shows a flowchart 600 describing a method of reducing ISI in an OFDM system in an aspect of this disclosure.

The OFDM transmitter/receiver, i.e. the eNB, initiates the process by performing a channel estimation 602 using sounding reference signals which are received at the eNB from another apparatus, e.g. a UE. The channel estimation may be performed on the multipaths of the OFDM system. The channel estimation in an aspect of this disclosure determines each paths' gain, delay, and at least one of the angle of arrival (AoA) or angle of departure (AoD) 604.

The least square or a DFT-based channel estimation algorithm can be applied to estimate the path gains and delays. The multiple signal classification (Music) or Estimation of signal parameters via rotation invariance techniques (Esprit) algorithm can be applied to estimate the path AoAs and/or AoDs.

The channel estimation is implemented at the receiver. If analog beamforming is available at the transmitter, the channel implementation can be implemented by exploiting the channel reciprocity, i.e. by using the uplink channel estimation to acquire downlink channel information.

After the aforementioned variables are determined, the analog beamforming may be optimized in order to maximize the spectrum efficiency of the system. If analog beamforming is available at the transmitter, the path gains and the AoDs are used in one of the optimization techniques. If analog beamforming is available at the receiver, the path gains and the AoAs are used in one of the optimization techniques.

The analog beamforming is optimized by considering a metric beneficial to the OFDM system. One such metric is maximizing per subcarrier SINR 608a (as described in equation (6)), and another metric is minimizing the ISI 608b (as described in equation (7)) caused by excessive channel delays. Other similar methods, such as maximizing the signal gains, may be employed in the analog beamforming optimization.

After the optimal beamforming (i.e. u) is determined, the beamforming is initialized 610 by setting the beamforming weights of the antenna elements to the proper phases in order to produce the determined optimal beamforming.

Once the analog beamforming is initialized, the OFDM data transmission is performed with the given analog beamforming.

By implementing the procedure described by flowchart 600, an OFDM system can employ a moderate CP, and thereby avoid the overhead of a large CP, while still reducing the impact of ISI due to excessive channel delays.

Figure 7:
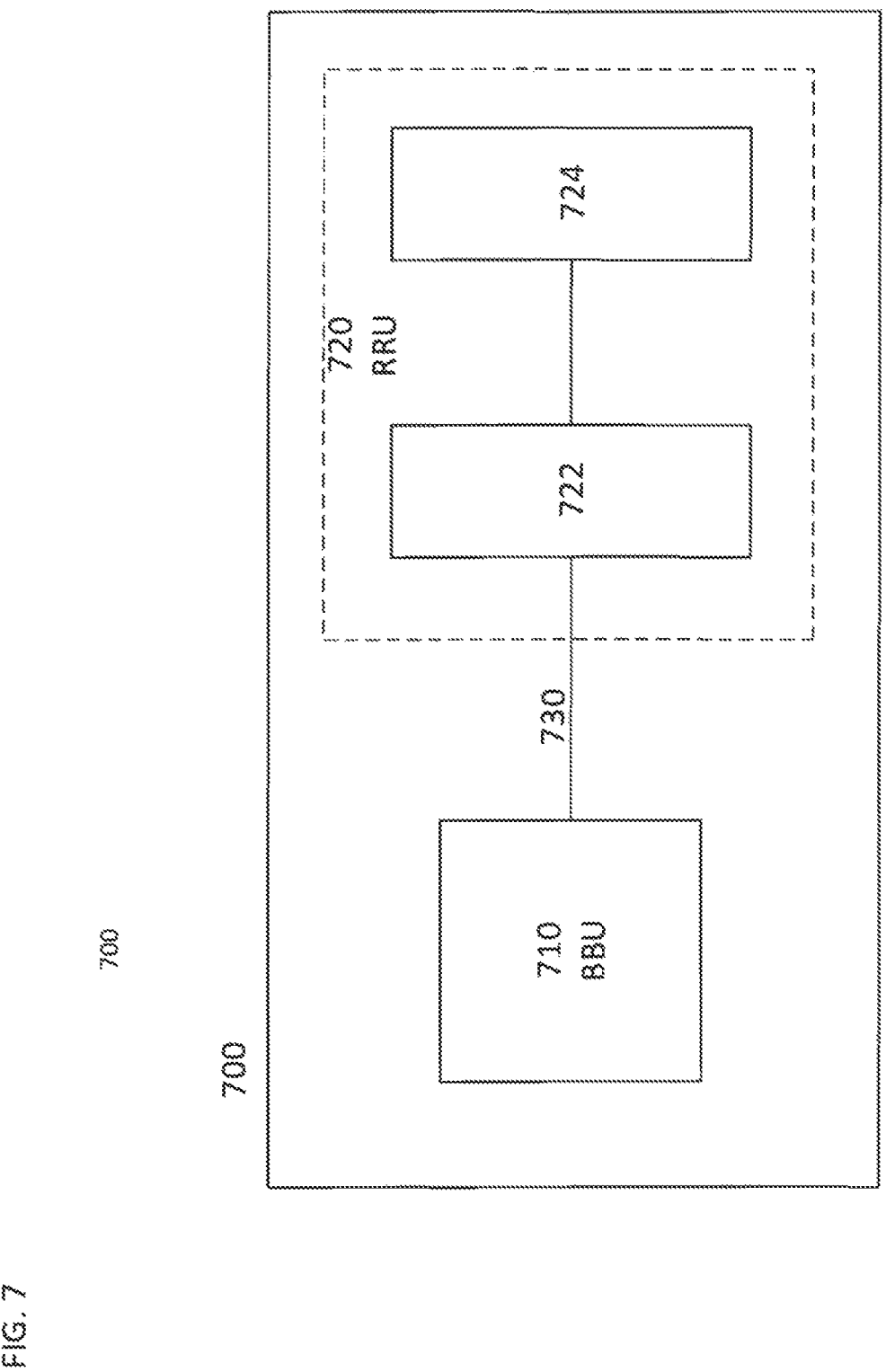
FIG. 7 shows a diagram of a communication device in an aspect of this disclosure.

FIG. 7 shows a diagram illustrating an exemplary internal configuration of a base station 700 in an aspect of this disclosure. It is appreciated that base station 700 is simplified for purposes of this explanation.

Base station 700 (e.g. eNB) may include baseband unit (BBU) 710 and remote radio unit (RRU) 720 components. It is appreciated that base station may include multiple BBUs 710 and/or RRUs 720 and may include these components in different configurations, e.g. BBU-RRU integrated components. It is also appreciated that base station 700 may include other components, e.g., at least one memory component, at least one power component, at least one analog combiner, etc.

The RRU 720 may comprise an array of antenna ports 722 which comprises circuitry for digital demodulation and an array of antenna elements 724 (corresponding to the antenna elements shown in more detail in FIG. 3) which comprises circuitry for analog demodulation. RRU may further comprise an analog combiner; an automatic gain control, analog to digital converter, and fast Fourier transform hardware; RB selection hardware; and channel estimation and compression hardware.

A BBU 710 may serve multiple RRUs 720 and may perform the baseband processing of mobile communication signals. BBUs may further provide or receive digital mobile communication signals to or from at least one RRU. The RRUs may be responsible for radio frequency processing of mobile communication signals and may include digital as well as analog circuitry in order to receive and perform initial processing on wireless radio frequency signals. The BBU 710 may exchange digital mobile communication data with one or more RRUs 720 over an optical fiber 730 or similar high-speed connection, such as using a Common Public Radio Interface (CPRI) standard over an optical fiber data link.

It is understood that the components of base station 700, such as the BBU 710, RRU 720, and all internal components thereof (e.g. the BBU hardware, RRW hardware, memory components, compression components, etc.) may be structurally implemented as hardware, software executed on hardware or a mixture thereof. Specifically, BBU 710 and RRU 720 may include one or more digital processing circuits, such as logic circuits, processors, microprocessors, Central Processing Units (CPUs), Graphics Processing Units (GPUs) (including General-Purpose Computing on GPU (GPGPU)), Digital Signal Processors (DSPs), Field Programmable Gate Arrays (FPGAs), integrated circuits, Application Specific Integrated Circuits (ASICs), or any combination thereof. It is understood that a person of skill in the art will appreciate the corresponding structure disclosed herein, be it in explicit reference to a physical structure and/or in the form of mathematical formulas, prose, flow charts, or any other manner providing sufficient structure (such as e.g. regarding an algorithm). The components of base station 700 components may be detailed herein substantially in terms of functional operation in recognition that a person of skill in the art may readily appreciate the various possible structural realizations of each component that will provide the desired functionality.

RRU 720 may exchange data with BBU 710 over RRU-BBU interconnection link 730, which may be e.g. an optical fiber. While the description may focus on the uplink path, it is understood that base station 700 may additionally be capable of operating on the downlink path.

Base station 700 may receive wireless uplink signals using RRU 720. An analog combiner in RRU 720 may then combine the resulting uplink data signals, such as by combining the uplink data signals from sets of two or more antennas of antenna array 724 in the analog domain. Analog combiner may thus yield analog data streams which indicate the number of analog data streams produced by analog combiner, which may be equal to or less than the actual number of physical receive antennas in antenna array 724.

RRU 720 may process the analog data streams received from analog combiner using processing circuitry. RRU 720 may perform automatic gain control (AGC) and analog-to-digital conversion (ADC) on the analog data streams received from analog combiner and subsequently perform Fast Fourier Transform (FFT) processing in order to generate frequency domain symbols.

RRU 720 may therefore further include channel estimation (CE) and compression hardware, which may be composed of digital processing circuitry. RRU 720 may thus require extra calculation and processing hardware, which may be utilized in order to perform channel estimation and calculate compression filters.

RRU 720 may then transmit resulting data to BBU 710 over RRU-BBU interconnection link 730. BBU 710 may receive the data and perform equalization and coordinated processing. BBU 710 may be composed of processing circuitry.

The digital processing circuits may be composed of various processing circuitry configured to perform baseband (also including "intermediate") frequency processing, such as Analog to Digital Converters and/or Digital to Analog Converters, modulation/demodulation circuitry, encoding/decoding circuitry, audio codec circuitry, digital signal processing circuitry, etc. The digital processing circuit(s) may include hardware, software, or a combination of hardware and software. Specifically, digital processing circuit(s) of BBU 710 may include one or more logic circuits, processors, microprocessors, controllers, microcontrollers, scalar processors, vector processors, Central Processing Units (CPU), Graphics Processing Units (GPU) (including General-Purpose Computing on GPU (GPGPU)), Digital Signal Processors (DSP), Field Programmable Gate Arrays (FPGA), integrated circuits, Application Specific Integrated Circuits (ASIC), etc., or any combination thereof.

The baseband memory may include volatile and/or non-volatile memory, including random access memory (RAM), read-only memory (ROM), flash memory, solid-state storage, magnetic tape, hard disk drive(s), optical drive(s), register(s), shift register(s), processor register(s), data buffer(s) etc., or any combination thereof. The baseband memory may be configured to store software elements, which may be retrieved and executed using a processor component of digital processing circuitry. The baseband memory may be implemented as one or more separate components in the BBU 710 and may also be partially or fully integrated with the digital processing circuitry.

The BBU 710 may be configured to operate one or more protocol stacks, such as a GSM protocol stack, an LTE protocol stack, a UMTS protocol stack, etc. or any combination thereof. BBU 710 may be multimode and may thus be configured to operate in accordance with multiple RATs by executing multiple protocol stacks simultaneously. The digital processing circuit(s) in the baseband modem may therefore include a processor configured to execute program code in accordance with the protocol stacks of each associated RAT. The baseband memory may be store the aforementioned program code. The BBU 710 may be configured to control one or more further components of base station 700. The protocol stack(s) of BBU 710 may be configured to control operation of the BBU 710, such as in order to transmit and receive mobile communication in accordance with the corresponding RAT(s).

It is understood that a person of skill in the art will appreciate the corresponding structure disclosed herein, be it in explicit reference to a physical structure and/or in the form of mathematical formulas, prose, flow charts, or any other manner providing sufficient structure (such as e.g. regarding an algorithm). The components of BBU 710 may be detailed herein substantially in terms of functional operation in recognition that a person of skill in the art may readily appreciate the various possible structural realizations of BBU 710 using digital processing circuitry that will provide the desired functionality.

The baseband unit (i.e. baseband modem or baseband processor) may be configured to receive at least one reference signal from another apparatus (via the RRU 720), determine a plurality of channel paths from the reference signal, perform a channel estimation on the plurality of channel paths, wherein the channel estimation comprises determining a channel path gain (i.e. channel power), a channel path delay, and at least one of a channel path AoA and/or an AoD.

The baseband unit may be further configured to determine an analog beamforming according to the variables determined in the channel estimation. For example, the baseband unit may employ the maximum SINR method in order to determine the beamforming direction (u) as shown in equation (6). Alternatively, the baseband unit may employ the minimum ISI method in order to determine the beamforming direction (u) as shown in equation (7). In either case, the baseband unit is configured to use a metric of the OFDM system (SINR, ISI, signal gains, etc.) in order to determine the optimal beamforming direction to maximize the spectrum efficiency of the OFDM system.

The baseband unit may further be configured to maximize the gains of the channel paths received/transmitted within the CP by shifting the analog beamforming directions towards the optimal directions as determined for example, by equation (6) or (7). In this manner, the channel gains of the paths with a delay within the CP are strengthened and the channel gains of paths with a delay exceeding the CP are weakened, leading to less ISI and a higher SINR.

While the BBU 710 and the RRU 720 are described as separate components of the base station 700, it is appreciated that components (or the entirety) of either may be integrated and perform the same methods described herein. Furthermore, a base station may different architectures, such as: all in one, in which all analog, digital, and power functions are performed in the same housing; distributed, in which case the RRU is separate from the BBU and connected by fiber (similar to the architecture shown in 700); or centralized radio access network (C-RAN, sometimes referred to as Cloud-RAN), in which case the digital function unite (i.e. the BBU) may be located at a centralized location (e.g. the Cloud) and serve multiple RRUs.

Figure 8:
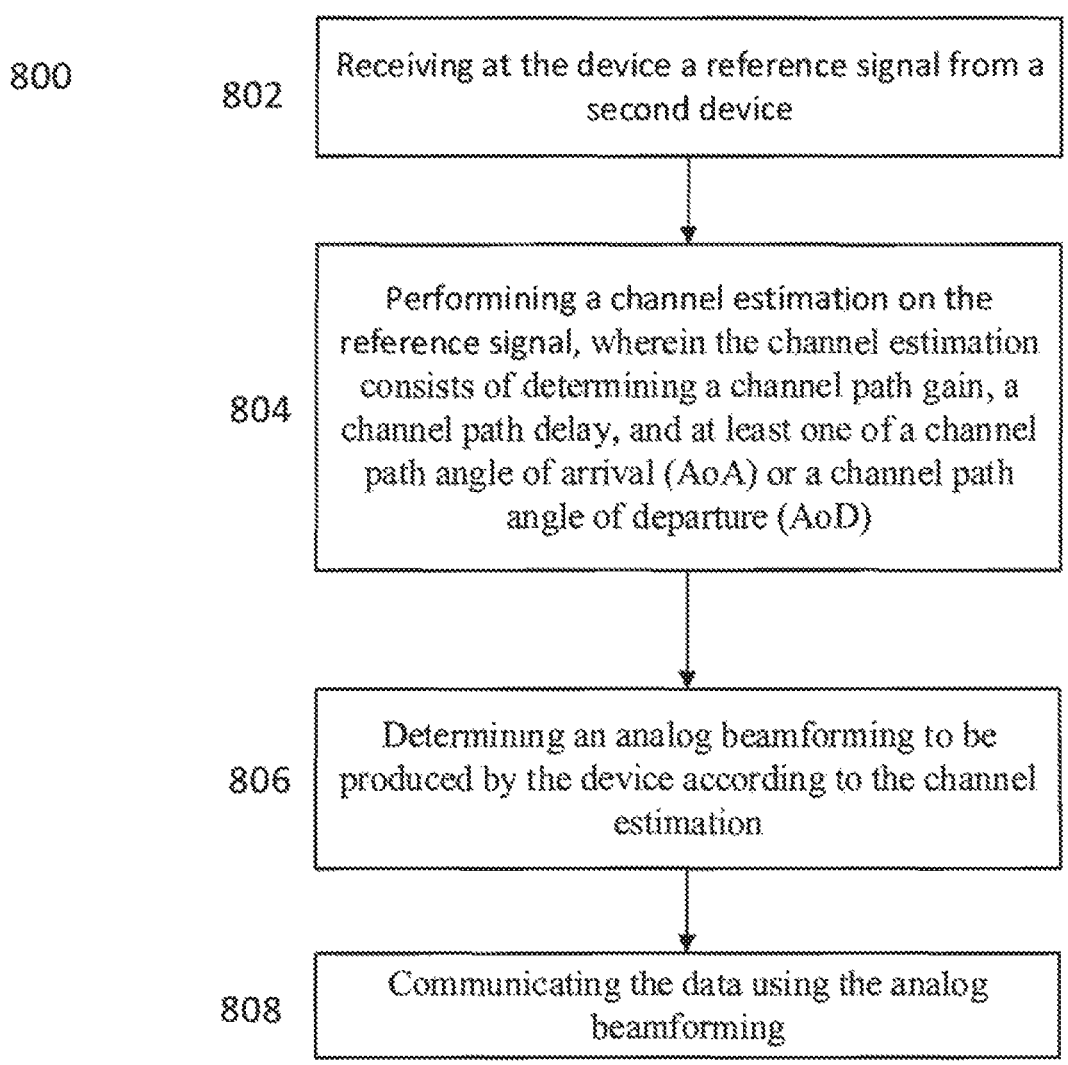
FIG. 8 shows a flowchart in an aspect of this disclosure.

FIG. 8 shows a flowchart 800 describing an aspect of this disclosure. It is appreciated that flowchart 800 is exemplary in nature and may thus be simplified for purpose of this explanation.

In 802, a reference signal from another apparatus is received. The reference signal may consist of the signal being distributed over a plurality of paths according to the OFDM parameters. After receiving the reference signal, a channel estimation is performed 804, wherein the channel estimation consists of determining a channel path gain, a channel path delay, and at least one of a channel path angle of arrival (AoA) or a channel path angle of departure (AoD). An analog beamforming is determined according to the channel estimation 806. The analog beamforming may be determined by determining an extremum value for a metric beneficial to the OFDM system. This metric may comprise determining the maximum signal-to-interference-plus-noise ratio (SINR) per sub-carrier (shown in equation (6)) or minimizing the ISI (as shown in equation (7)). After determining the optimum beamforming pattern in order to maximize the signal gains within the CP, the data is communicated using the analog beamforming 808.

FIG. 9 shows a flowchart 900 in an aspect of this disclosure. It is appreciated that flowchart 900 is exemplary in nature and may be simplified for purposes of this explanation.

In 902, the device receives a reference signal from another apparatus. The reference signal may consist of the signal being distributed over a plurality of paths according to the OFDM parameters. After receiving the reference signal, the device performs a channel estimation on the reference signal, wherein the channel estimation comprises determining a channel path delay for each of the plurality of channel paths. In 906, the device determines an analog beamforming, wherein the analog beamforming is directed towards the channel paths who have a channel path delay within a cyclic prefix of the OFDM system, i.e. the channel path delay is shorter in time than the cyclic prefix of the OFDM system. In 908, the device uses the analog beamforming in order to communicate with the other apparatus.

In Example 1, a method for a device to communicate a data in an orthogonal frequency division multiplexing (OFDM) system, comprising receiving at the device at least one reference signal from a second device via a plurality of channel paths; performing a channel estimation on the plurality of channel paths, wherein the channel estimation comprises determining a channel path gain, a channel path delay, and at least one of a channel path angle of arrival (AoA) or a channel path angle of departure (AoD); determining an analog beamforming to be produced by the device according to the channel estimation; and communicating the data using the analog beamforming.

In Example 2, the subject matter of Example 1 may include wherein the reference signal from the second device is a sounding reference signal from a user equipment (UE).

In Example 3, the subject matter of Examples 1-2 may include using a least square algorithm to determine the channel path gain.

In Example 4, the subject matter of Examples 1-3 may include using multiple signal classification to determine the channel path AoS or the channel path AoD.

In Example 5, the subject matter of Examples 1-3 may include using estimation of signal parameters via rotation invariance techniques to determine the channel path AoS or the channel path AoD.

In Example 6, the subject matter of Examples 1-5 may include implementing the channel estimation at a receiver of the device.

In Example 7, the subject matter of Example 6 may include wherein the receiver of the device comprises a plurality of antenna elements.

In Example 8, the subject matter of Examples 1-7 may include implementing the channel estimation by using an uplink channel estimation to acquire a downlink channel information.

In Example 9, the subject matter of Examples 1-8 may include using the channel path gain and the AoD if analog beamforming is available at a transmitter of the device.

In Example 10, the subject matter of Examples 1-8 may include using the channel path gain and the AoA if analog beamforming is available at a receiver of the device.

In Example 11, the subject matter of Examples 1-10 may include wherein determining the analog beamforming comprises determining an extremum value for a metric beneficial to the OFDM system.

In Example 12, the subject matter of Example 11 may include wherein determining the extremum value for the metric comprises determining a maximum for a signal-to-interference-plus-noise ratio (SINR) per sub-carrier.

In Example 13, the subject matter of Examples 1-12 may include wherein determining the analog beamforming direction is done by the following equation:

$$u = \mathrm{argmax}_u \frac{P \sum_{m=1}^{l} G_m \frac{\sin^2\left(\frac{N(\theta_m - u)}{2}\right)}{\sin^2\left(\frac{\theta_m - u}{2}\right)}}{1 + P \sum_{j=l+1}^{M} G_j \frac{\sin^2\left(\frac{N(\theta_j - u)}{2}\right)}{\sin^2\left(\frac{\theta_j - u}{2}\right)}}$$

where u is the analog beamforming direction; P is a transmit power per each sub-carrier; $G_m$ and $G_j$ is a channel gain for a mth and a jth path, respectively; N is a number of antenna elements; $\theta_m$ and $\theta_j$ is an AoA or the AoD for the mth and jth paths, respectively; and M is a number of channel paths.

In Example 14, the subject matter of Example 11 may include wherein determining the extremum value for the metric comprises determining a minimum for an inter-symbol interference caused by excessive channel delays.

In Example 15, the subject matter of Examples 1-11 or 14 may include wherein determining the analog beamforming direction is done by the following equation:

$$u = \mathrm{argmin}_u P \sum_{j=l+1}^{M} G_j \frac{\sin^2\left(\frac{N(\theta_j - u)}{2}\right)}{\sin^2\left(\frac{\theta_j - u}{2}\right)}$$

where u is the analog beamforming direction; P is a transmit power per each sub-carrier; $G_j$ is a channel gain for the jth path; N is a number of antenna elements; and $\theta_j$ is an AoA or AoD for the jth path.

In Example 16, a method for a device to communicate a data in an orthogonal frequency division multiplexing (OFDM) system, comprising receiving at the device at least one reference signal from a second device via a plurality of channel paths; performing a channel estimation on the plurality of channel paths, wherein the channel estimation comprises determining a channel path delay for each of the plurality of channel paths; determining an analog beamforming to be produced by the device, wherein the analog beamforming is directed towards channel paths with a channel path delay within a cyclic prefix of the OFDM system; and communicating the data using the analog beamforming.

In Example 17, the subject matter of Example 16 may include wherein the reference signal is a sounding reference signal from a user equipment (UE).

In Example 18, the subject matter of Examples 16-17 may include wherein the channel estimation further comprises determining a channel path gain.

In Example 19, the subject matter of Examples 16-18 may include wherein the channel estimation further comprises determining at least one of a channel path angle of arrival (AoA) or a channel path angle of departure (AoD).

In Example 20, the subject matter of Example 18 may include determining the channel path gain using a least square algorithm.

In Example 21, the subject matter of Example 19 may include using multiple signal classification to determine the channel path AoA or the channel path AoD.

In Example 22, the subject matter of Examples 19 may include using estimation of signal parameters via rotation invariance techniques to determine the channel path AoA or the channel path AoD.

In Example 23, the subject matter of Examples 16-22 may include implementing the channel estimation at a receiver of the device.

In Example 24, the subject matter of Example 23 may include wherein the receiver of the device comprises a plurality of antenna elements.

In Example 25, the subject matter of Examples 16-24 may include implementing the channel estimation by using an uplink channel estimation to acquire a downlink channel information.

In Example 26, the subject matter of Examples 16-25 may include comprising using the channel path gain and the AoD if analog beamforming is available at a transmitter of the device.

In Example 27, the subject matter of Examples 16-25 may include using the channel path gain and the AoA if analog beamforming is available at a receiver of the device.

In Example 28, the subject matter of Examples 16-27 may include wherein determining the analog beamforming comprises determining an extremum value for a metric beneficial to the OFDM system.

In Example 29, the subject matter of Example 28 may include wherein determining the extremum value for the metric comprises determining a maximum for a signal-to-interference-plus-noise ratio (SINR) per sub-carrier.

In Example 30, the subject matter of Examples 16-29 may include wherein determining the analog beamforming direction is done by the following equation:

$$u = \text{argmax}_u \frac{P \sum_{m=1}^{l} G_m \frac{\sin^2\left(\frac{N(\theta_m - u)}{2}\right)}{\sin^2\left(\frac{\theta_m - u}{2}\right)}}{1 + P \sum_{j=l+1}^{M} G_j \frac{\sin^2\left(\frac{N(\theta_j - u)}{2}\right)}{\sin^2\left(\frac{\theta_j - u}{2}\right)}}$$

where u is the analog beamforming direction; P is the transmit power per each sub-carrier; $G_m$ and $G_j$ is a channel gain for a mth and a jth path, respectively; N is a number of antenna elements; $\theta_m$ and $\theta_j$ is an AoA or AoD for the mth and jth paths, respectively; and M is the number of paths.

In Example 31, the subject matter of Example 28 may include wherein determining the extremum value for the metric comprises determining a minimum for an inter-symbol interference caused by excessive channel delays.

In Example 32, the subject matter of Examples 16-28 or 31 may include wherein determining the analog beamforming direction is done by the following equation:

$$u = \text{argmin}_u P \sum_{j=l+1}^{M} G_j \frac{\sin^2\left(\frac{N(\theta_j - u)}{2}\right)}{\sin^2\left(\frac{\theta_j - u}{2}\right)}$$

where u is the analog beamforming direction; P is a transmit power per each sub-carrier; $G_j$ is the channel gain for a jth path; N is a number of antenna elements; and $\theta_j$ is the AoA or AoD for the jth path.

In Example 33, a device configured to communicate a data in an orthogonal frequency division multiplexing (OFDM) system, comprising a radio frequency (RF) unit configured to receive at least one reference signal from a second device via a plurality of channel paths; a baseband unit configured to perform a channel estimation on the plurality of channel paths, wherein the channel estimation comprises determine a channel path gain, a channel path delay, and at lease one of a channel path angle of arrival (AoA) or a channel path angle of departure (AoD); determine an analog beamforming to be produced by the device according to the channel estimation; and wherein the device is further configured to communicate the data with the second device using the analog beamforming.

In Example 34, the subject matter of Example 33 may include wherein the RF unit and the baseband unit are integrated into a single unit.

In Example 35, the subject matter of Examples 33-34 may include the baseband unit further configured to use a least square algorithm to determine the channel path gain.

In Example 36, the subject matter of Examples 33-35 may include the baseband unit further configured to use multiple signal classification to determine the channel path AoA or the channel path AoD.

In Example 37, the subject matter of Examples 33-35 may include the baseband unit further configured to use estimation of signal parameters via rotation invariance techniques to determine the channel path AoA or the channel path AoD.

In Example 38, the subject matter of Example 33-37 may include the baseband unit being implemented at a receiver in the RF unit of the device.

In Example 39, the subject matter of Examples 33-38 may include wherein the RF unit comprises a plurality of antenna elements.

In Example 40, the subject matter of Examples 33-39 may include the baseband unit further configured to implement the channel estimation by using an uplink channel estimation to acquire a downlink channel information.

In Example 41, the subject matter of Examples 33-40 may include the baseband unit further configured to use the channel path gain and the AoD if analog beamforming is available at a transmitter of the device.

In Example 42, the subject matter of Examples 33-40 may include the baseband unit further configured to use the channel path gain and the AoA if analog beamforming is available at a receiver of the device.

In Example 43, the subject matter of Examples 33-42 may include the baseband unit being further configured to determine the analog beamforming by determining an extremum value for a metric beneficial to the OFDM system.

In Example 44, the subject matter of Example 43 may include wherein the extremum value for the metric comprises a maximum for a signal-to-interference-plus-noise ratio (SINR) per sub-carrier.

In Example 45, the subject matter of Examples 33-44 may include the baseband unit being further configured to determine the analog beamforming direction by the following equation:

$$u = \text{argmax}_u \frac{P \sum_{m=1}^{l} G_m \frac{\sin^2\left(\frac{N(\theta_m - u)}{2}\right)}{\sin^2\left(\frac{\theta_m - u}{2}\right)}}{1 + P \sum_{j=l+1}^{M} G_j \frac{\sin^2\left(\frac{N(\theta_j - u)}{2}\right)}{\sin^2\left(\frac{\theta_j - u}{2}\right)}}$$

where u is the analog beamforming direction; P is a transmit power per each sub-carrier; $G_m$ and $G_j$ is a channel gain for the mth and a jth path, respectively; N is a number of antenna elements; $\theta_m$ and $\theta_j$ is an AoA or the AoD for the mth and jth paths, respectively; and M is a number of channel paths.

In Example 46, the subject matter of Example 43 may include wherein the extremum value for the metric comprises a minimum for an inter-symbol interference caused by excessive channel delays.

In Example 47, the subject matter of Examples 33-43 or 46 may include the baseband unit being further configured to determine the analog beamforming direction by the following equation:

$$u = \text{argmin}_u P \sum_{j=l+1}^{M} G_j \frac{\sin^2\left(\frac{N(\theta_j - u)}{2}\right)}{\sin^2\left(\frac{\theta_j - u}{2}\right)}$$

where u is the analog beamforming direction; P is a transmit power per each sub-carrier; $G_j$ is a channel gain for a jth path; N is a number of antenna elements; and $\theta_j$ is an AoA or AoD for the jth path.

In Example 48, a device configured to communicate a data in an orthogonal frequency division multiplexing (OFDM) system, comprising a radio frequency (RF) unit configured to receive at least one reference signal from a second device via a plurality of channel paths; a baseband unit configured to perform a channel estimation on the plurality of channel paths, wherein the channel estimation comprises determine a channel path delay for each of the plurality of channel paths; determining an analog beamforming to be produced by the device, wherein the analog beamforming is directed towards channel paths with a channel path delay within a cyclic prefix of the OFDM system; wherein the device is further configured to communicate the data with the second device using the analog beamforming.

In Example 49, the subject matter of Example 48 may include wherein the RF unit and the baseband unit are integrated into a single unit.

In Example 50, the subject matter of Examples 48-49 may include the baseband unit further configured to determine a channel path gain.

In Example 51, the subject matter of Examples 48-50 may include the baseband unit further configured to determine at least one of a channel path angle of arrival (AoA) or a channel path angle of departure (AoD).

In Example 52, the subject matter of Examples 48-51 may include the baseband unit further configured to use a least square algorithm to determine the channel path gain.

In Example 53, the subject matter of Examples 48-52 may include the baseband unit further configured to use multiple signal classification to determine the channel path AoA or the channel path AoD.

In Example 54, the subject matter of Examples 48-53 may include the baseband unit being further configured to use estimation of signal parameters via rotation invariance techniques to determine the channel path AoS or the channel path AoD.

In Example 55, the subject matter of Examples 48-54 may include the baseband unit being implemented at a receiver in the RF unit of the device.

In Example 56, the subject matter of Examples 48-55 may include wherein the RF unit comprises a plurality of antenna elements.

In Example 57, the subject matter of Examples 48-56 may include the baseband unit further configured to implement the channel estimation by using an uplink channel estimation to acquire a downlink channel information.

In Example 58, the subject matter of Examples 48-57 may include the baseband unit further configured to use the channel path gain and the AoD if analog beamforming is available at a transmitter of the device.

In Example 59, the subject matter of Examples 48-57 may include the baseband unit further configured to use the channel path gain and the AoA if analog beamforming is available at a receiver of the device.

In Example 60, the subject matter of Examples 48-59 may include the baseband unit being further configured to determine the analog beamforming by determining an extremum value for a metric beneficial to the OFDM system.

In Example 61, the subject matter of Example 60 may include wherein the extremum value for the metric comprises a maximum for a signal-to-interference-plus-noise ratio (SINR) per sub-carrier.

In Example 62, the subject matter of Examples 48-61 may include the baseband unit being further configured to determine the analog beamforming direction by the following equation:

$$u = \mathrm{argmax}_u \frac{P \sum_{m=1}^{l} G_m \frac{\sin^2\left(\frac{N(\theta_m - u)}{2}\right)}{\sin^2\left(\frac{\theta_m - u}{2}\right)}}{1 + P \sum_{j=l+1}^{M} G_j \frac{\sin^2\left(\frac{N(\theta_j - u)}{2}\right)}{\sin^2\left(\frac{\theta_j - u}{2}\right)}}$$

where u is the analog beamforming direction; P is a transmit power per each sub-carrier; $G_m$ and $G_j$ is a channel gain for a mth and a jth path, respectively; N is a number of antenna elements; $\theta_m$ and $\theta_j$ is an AoA or the AoD for the mth and jth paths, respectively; and M is a number of channel paths.

In Example 63, the subject matter of Example 60 may include wherein the extremum value for the metric comprises a minimum for an inter-symbol interference caused by excessive channel delays.

In Example 64, the subject matter of Examples 48-60 or 63 may include the baseband unit being further configured to determine the analog beamforming direction by the following equation:

$$u = \mathrm{argmin}_u P \sum_{j=l+1}^{M} G_j \frac{\sin^2\left(\frac{N(\theta_j - u)}{2}\right)}{\sin^2\left(\frac{\theta_j - u}{2}\right)}$$

where u is the analog beamforming direction; P is a transmit power per each sub-carrier; $G_j$ is a channel gain for a jth path; N is a number of antenna elements; and $\theta_j$ is an AoA or AoD for the jth path.

In Example 65, a non-transitory computer readable medium with program instructions configured to cause a processor of a device to communicate a data in an orthogonal frequency division multiplexing (OFDM) system, comprising receiving at the device at least one reference signal from a second device via a plurality of channel paths; performing a channel estimation on the plurality of channel paths, wherein the channel estimation comprises determining a channel path gain, a channel path delay, and at least one of a channel path angle of arrival (AoA) or a channel path angle of departure (AoD); determining an analog beamforming to be produced by the device according to the channel estimation; and communicating the data using the analog beamforming.

In Example 66, the subject matter of Example 65 may include wherein the reference signal from the second device is a sounding reference signal from a user equipment (UE).

In Example 67, the subject matter of Examples 65-66 may include using a least square algorithm to determine the channel path gain.

In Example 68, the subject matter of Examples 65-67 may include using multiple signal classification to determine the channel path AoS or the channel path AoD.

In Example 69, the subject matter of Examples 65-67 may include using estimation of signal parameters via rotation invariance techniques to determine the channel path AoS or the channel path AoD.

In Example 70, the subject matter of Examples 65-69 may include implementing the channel estimation at a receiver of the device.

In Example 71, the subject matter of Example 70 may include wherein the receiver of the device comprises a plurality of antenna elements.

In Example 72, the subject matter of Example 65-71 may include implementing the channel estimation by using an uplink channel estimation to acquire a downlink channel information.

In Example 73, the subject matter of Examples 65-72 may include using the channel path gain and the AoD if analog beamforming is available at a transmitter of the device.

In Example 74, the subject matter of Examples 65-72 may include using the channel path gain and the AoA if analog beamforming is available at a receiver of the device.

In Example 75, the subject matter of Examples 65-74 may include wherein determining the analog beamforming comprises determining an extremum value for a metric beneficial to the OFDM system.

In Example 76, the subject matter of Example 75 may include wherein determining the extremum value for the metric comprises determining a maximum signal-to-interference-plus-noise ratio (SINR) per sub-carrier.

In Example 77, the subject matter of Examples 65-76 may include wherein determining the analog beamforming direction is done by the following equation:

$$u = \mathrm{argmax}_u \frac{P \sum_{m=1}^{l} G_m \frac{\sin^2\left(\frac{N(\theta_m - u)}{2}\right)}{\sin^2\left(\frac{\theta_m - u}{2}\right)}}{1 + P \sum_{j=l+1}^{M} G_j \frac{\sin^2\left(\frac{N(\theta_j - u)}{2}\right)}{\sin^2\left(\frac{\theta_j - u}{2}\right)}}$$

where u is the analog beamforming direction; P is a transmit power per each sub-carrier; $G_m$ and $G_j$ is a channel gain for a mth and a jth path, respectively; N is a number of antenna elements; $\theta_m$ and $\theta_j$ is an AoA or the AoD for the mth and jth paths, respectively; and M is a number of channel paths.

In Example 78, the subject matter of Example 75 may include wherein determining the extremum value for the metric comprises determining a minimum inter-symbol interference caused by excessive channel delays.

In Example 79, the subject matter of Examples 65-75 or 78 may include wherein determining the analog beamforming direction is done by the following equation:

$$u = \mathrm{argmin}_u P \sum_{j=l+1}^{M} G_j \frac{\sin^2\left(\frac{N(\theta_j - u)}{2}\right)}{\sin^2\left(\frac{\theta_j - u}{2}\right)}$$

where u is the analog beamforming direction; P is a transmit power per each sub-carrier; $G_j$ is a channel gain for a jth path; N is a number of antenna elements; and $\theta_j$ is an AoA or AoD for the jth path.

In Example 80, a non-transitory computer readable medium with program instructions configured to cause a processor of a device to communicate a data in an orthogonal frequency division multiplexing (OFDM) system, comprising receiving at the device at least one reference signal from a second device via a plurality of channel paths; performing a channel estimation on the plurality of channel paths, wherein the channel estimation comprises determining a channel path delay for each of the plurality of channel paths; determining an analog beamforming to be produced by the device, wherein the analog beamforming is directed towards channel paths with a channel path delay within a cyclic prefix of the OFDM system; and communicating the data using the analog beamforming.

In Example 81, the subject matter of Example 80 may include wherein the at least one reference signal is a sounding reference signal from a user equipment (UE).

In Example 82, the subject matter of Examples 80-81 may include wherein the channel estimation further comprises determining a channel path gain.

In Example 83, the subject matter of Examples 80-82 may include wherein the channel estimation further comprises determining at least one of a channel path angle of arrival (AoA) or a channel path angle of departure (AoD).

In Example 84, the subject matter of Example 82 may include determining the channel path gain using a least square algorithm.

In Example 85, the subject matter of Example 83 may include using multiple signal classification to determine the channel path AoS or the channel path AoD.

In Example 86, the subject matter of Example 83 may include using estimation of signal parameters via rotation invariance techniques to determine the channel path AoS or the channel path AoD.

In Example 87, the subject matter of Example 80-86 may include implementing the channel estimation at a receiver of the device.

In Example 88, the subject matter of Example 87 may include wherein the receiver of the device comprises a plurality of antenna elements.

In Example 89, the subject matter of Examples 80-88 may include implementing the channel estimation by using an uplink channel estimation to acquire a downlink channel information.

In Example 90, the subject matter of Examples 80-89 may include using the channel path gain and the AoD if analog beamforming is available at a transmitter of the device.

In Example 91, the subject matter of Examples 80-89 may include using the channel path gain and the AoA if analog beamforming is available at a receiver of the device.

In Example 92, the subject matter of Examples 80-91 may include wherein determining the analog beamforming comprises determining an extremum value for a metric beneficial to the OFDM system.

In Example 93, the subject matter of Example 92 may include wherein determining the extremum value for the metric comprises determining a maximum signal-to-interference-plus-noise ratio (SINR) per sub-carrier.

In Example 94, the subject matter of Examples 80-93 may include wherein determining the analog beamforming direction is done by the following equation:

$$u = \mathrm{argmax}_u \frac{P \sum_{m=1}^{l} G_m \frac{\sin^2\left(\frac{N(\theta_m - u)}{2}\right)}{\sin^2\left(\frac{\theta_m - u}{2}\right)}}{1 + P \sum_{j=l+1}^{M} G_j \frac{\sin^2\left(\frac{N(\theta_j - u)}{2}\right)}{\sin^2\left(\frac{\theta_j - u}{2}\right)}}$$

where u is the analog beamforming direction; P is a transmit power per each sub-carrier: $G_m$ and $G_j$ is a channel gain for a mth and a jth path, respectively; N is a number of antenna elements; $\theta_m$ and $\theta_j$ is an AoA or the AoD for the mth and jth paths, respectively; and M is a number of channel paths.

In Example 95, the subject matter of Example 92 may include comprising wherein determining the extremum value for the metric comprises determining a minimum inter-symbol interference caused by excessive channel delays.

In Example 96, the subject matter of Examples 80-92 or 95 may include wherein determining the analog beamforming direction is done by the following equation:

$$u = \operatorname{argmin}_u P \sum_{j=l+1}^{M} G_j \frac{\sin^2\left(\frac{N(\theta_j - u)}{2}\right)}{\sin^2\left(\frac{\theta_j - u}{2}\right)}$$

where u is the analog beamforming direction: P is a transmit power per each sub-carrier; $G_j$ is a channel gain for a jth path; N is a number of antenna elements; and $\theta_j$ is an AoA or AoD for the jth path.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include a one or more components configured to perform each aspect of the related method.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims, and all changes within the meaning and range of equivalency of the claims are therefore intended to be embraced.

What is claimed is:

1. A device configured to communicate a data in an orthogonal frequency division multiplexing (OFDM) system, comprising:
   a radio frequency (RF) antenna configured to receive at least one reference signal from a second device via a plurality of channel paths;
   a baseband modem configured to:
   perform a channel estimation on the plurality of channel paths, wherein the channel estimation comprises determining a channel path gain, a channel path delay, and at least one of a channel path angle of arrival (AoA) or a channel path angle of departure (AoD); and
   determine an analog beamforming to be produced by the device according to the channel estimation, wherein the analog beamforming is determined by determining an extremum value of the OFDM system, wherein the extremum value comprises a maximum for a signal-to-interference-plus-noise ratio (SINR) per sub-carrier or a minimum for an inter-symbol interference caused by channel delays; and
   wherein the device is further configured to communicate the data with the second device using the analog beamforming.

2. The device of claim 1, wherein the RF antenna and the baseband modem are integrated into a single unit.

3. The device of claim 1, the baseband modem further configured to use a least square algorithm to determine the channel path gain.

4. The device of claim 1, the baseband modem further configured to use multiple signal classification to determine the channel path AoA or the channel path AoD.

5. The device of claim 1, the baseband modem further configured to use estimation of signal parameters via rotation invariance techniques to determine the channel path AoA or the channel path AoD.

6. The device of claim 1, the baseband modem further configured to implement the channel estimation by using an uplink channel estimation to acquire a downlink channel information.

7. The device of claim 1, the baseband modem being further configured to determine the analog beamforming direction by the following equation:

$$u = \text{the } \operatorname{margmax}_u \frac{P \sum_{m=1}^{l} G_m \frac{\sin^2\left(\frac{N(\theta_m - u)}{2}\right)}{\sin^2\left(\frac{\theta_m - u}{2}\right)}}{1 + P \sum_{j=l+1}^{M} G_j \frac{\sin^2\left(\frac{N(\theta_j - u)}{2}\right)}{\sin^2\left(\frac{\theta_j - u}{2}\right)}}$$

where u is the analog beamforming direction; P is a transmit power per each sub-carrier; $G_m$ and $G_j$ is a channel gain for the mth and a jth path, respectively; N is a number of antenna elements; $\theta_m$ and $\theta_j$ is an AoA or the AoD for the mth and jth paths, respectively; and M is a number of channel paths.

8. The device of claim 1, the baseband modem being further configured to determine the analog beamforming direction by the following equation:

$$u = \operatorname{argmin}_u P \sum_{j=l+1}^{M} G_j \frac{\sin^2\left(\frac{N(\theta_j - u)}{2}\right)}{\sin^2\left(\frac{\theta_j - u}{2}\right)}$$

where u is the analog beamforming direction; P is a transmit power per each sub-carrier; $G_j$ is a channel gain for a jth path; N is a number of antenna elements; and $\theta_j$ is an AoA or AoD for the jth path.

9. A device configured to communicate a data in an orthogonal frequency division multiplexing (OFDM) system, comprising:
   a radio frequency (RF) antenna configured to receive at least one reference signal from a second device via a plurality of channel paths;
   a baseband modem configured to:
   perform a channel estimation on the plurality of channel paths, wherein the channel estimation comprises determining a channel path delay for each of the plurality of channel paths; and
   determine an analog beamforming to be produced by the device by determining a minimum for an inter-symbol interference caused by channel delays, wherein the analog beamforming is directed towards channel paths with a channel path delay with a duration equal to or less than a cyclic prefix duration of the OFDM system;
   wherein the device is further configured to communicate the data with the second device using the analog beamforming.

10. The device of claim 9, wherein the RF antenna and the baseband modem are integrated into a single unit.

11. The device of claim 9, the baseband modem further configured to implement the channel estimation by using an uplink channel estimation to acquire a downlink channel information.

12. The device of claim 9, the baseband modem being further configured to determine the analog beamforming by determining an extremum value for a metric beneficial to the OFDM system, wherein the extremum value for the metric comprises a maximum for a signal-to-interference-plus-noise ratio (SINR) per sub-carrier.

13. A method for a device to communicate a data in an orthogonal frequency division multiplexing (OFDM) system, comprising:
    receiving at the device at least one reference signal from a second device via a plurality of channel paths;
    performing a channel estimation on the plurality of channel paths, wherein the channel estimation comprises determining a channel path gain, a channel path delay, and at least one of a channel path angle of arrival (AoA) or a channel path angle of departure (AoD), wherein the analog beamforming is determined by determining an extremum value of the OFDM system, wherein the extremum value comprises a maximum for a signal-to-interference-plus-noise ratio (SINR) per sub-carrier or a minimum for an inter-symbol interference caused by channel delays;
    determining an analog beamforming to be produced by the device according to the channel estimation; and
    communicating the data using the analog beamforming.

14. The method of claim 13, further comprising implementing the channel estimation by using an uplink channel estimation to acquire a downlink channel information.

15. The method of claim 13, further comprising wherein determining the analog beamforming comprises determining an extremum value for a metric beneficial to the OFDM system, wherein determining the extremum value for the metric comprises determining a maximum for a signal-to-interference-plus-noise ratio (SINR) per sub-carrier.

16. The method of claim 13, further comprising wherein determining the analog beamforming comprises determining an extremum value for a metric beneficial to the OFDM system, wherein determining the extremum value for the metric comprises determining a minimum for an inter-symbol interference caused by channel delays.

17. A method for a device to communicate a data in an orthogonal frequency division multiplexing (OFDM) system, comprising:
    receiving at the device at least one reference signal from a second device via a plurality of channel paths;
    performing a channel estimation on the plurality of channel paths, wherein the channel estimation comprises determining a channel path delay for each of the plurality of channel paths;
    determining an analog beamforming to be produced by the device by determining a minimum for an inter-symbol interference caused by channel delays, wherein the analog beamforming is directed towards channel paths with a channel path delay with a duration equal to or less than a cyclic prefix duration of the OFDM system; and
    communicating the data using the analog beamforming.

18. The method of claim 17, further comprising wherein the channel estimation further comprises determining a channel path gain.

19. The method of claim 17, further comprising wherein the channel estimation further comprises determining at least one of a channel path angle of arrival (AoA) or a channel path angle of departure (AoD).

20. The method of claim 17, further comprising wherein determining the analog beamforming comprises determining an extremum value for a metric beneficial to the OFDM system, wherein determining the extremum value for the metric comprises determining a maximum for a signal-to-interference-plus-noise ratio (SINR) per sub-carrier.

\* \* \* \* \*